(12) United States Patent
Villela et al.

(10) Patent No.: US 9,771,982 B2
(45) Date of Patent: Sep. 26, 2017

(54) WHEEL BEARING ARRANGEMENT FOR A VEHICLE

(71) Applicant: Schaeffler Technologies AG & Co. KG, Herzogenaurach (DE)

(72) Inventors: Rafael Villela, Sorocaba (BR); Alexandre Camilo, Rochester Hills, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/089,841

(22) Filed: Apr. 4, 2016

(65) Prior Publication Data
US 2016/0356311 A1    Dec. 8, 2016

(30) Foreign Application Priority Data
Jun. 3, 2015 (DE) .................. 10 2015 210 242

(51) Int. Cl.
*F16C 19/38* (2006.01)
*F16C 33/66* (2006.01)
(Continued)

(52) U.S. Cl.
CPC ............ *F16C 35/061* (2013.01); *B60B 27/00* (2013.01); *F16C 33/664* (2013.01);
(Continued)

(58) Field of Classification Search
CPC ........ F16C 19/28; F16C 19/38; F16C 19/386; F16C 33/30; F16C 33/664; F16C 33/6607;
(Continued)

(56) References Cited

U.S. PATENT DOCUMENTS 2,272,757 A * 2/1942 Teker .................. F16C 33/6607
384/466
3,892,284 A 7/1975 Braess et al.
(Continued)

FOREIGN PATENT DOCUMENTS

DE    2200351    12/1972
DE    3915624    11/1990
(Continued)

*Primary Examiner* — Marcus Charles
(74) *Attorney, Agent, or Firm* — Volpe and Koenig, P.C.

(57) ABSTRACT

A wheel bearing arrangement for a vehicle, having rotatable and statically fixed components, and at least two rolling body bearings arranged radially between the rotatable and statically fixed components for rotatably mounting the rotatable component. The at least two rolling body bearings have in each case an inner ring, an outer ring, and a rolling body row arranged therebetween. A spacer sleeve is arranged at end sides of the respective inner rings for axially securing the two inner rings. A respective securing ring is arranged fixedly on the respective inner rings so as to rotate therewith. The securing rings each have a substantially axially configured lug with a respective radial embossment arranged in a respective groove configured on an outer circumferential face of the spacer sleeve, in order to connect the respective inner rings axially to the spacer sleeve via the respective securing rings.

11 Claims, 1 Drawing Sheet

(51) Int. Cl.
*F16C 33/30* (2006.01)
*B60B 27/00* (2006.01)
*F16C 19/28* (2006.01)
*F16C 35/06* (2006.01)

(52) U.S. Cl.
CPC ........ *F16C 33/6614* (2013.01); *F16C 19/386* (2013.01); *F16C 2326/02* (2013.01)

(58) Field of Classification Search
CPC ... F16C 33/7879; F16F 33/6614; B60B 27/00
USPC ....... 384/473, 474, 499, 504, 539, 544, 561, 384/563, 569, 571, 589, 481
See application file for complete search history.

(56) References Cited

U.S. PATENT DOCUMENTS

| | | | | |
|---|---|---|---|---|
| 4,798,482 A | * | 1/1989 | Kruk | F16C 19/385 384/559 |
| 4,838,841 A | * | 6/1989 | Harvey | F16C 19/54 384/571 |
| 4,997,294 A | * | 3/1991 | Hillmann | F16C 19/388 384/477 |
| 5,080,156 A | * | 1/1992 | Bartos | B60C 23/003 152/415 |
| 5,388,917 A | * | 2/1995 | Hibi | B23Q 1/265 384/493 |
| 5,492,419 A | * | 2/1996 | Miller | F16C 19/386 384/477 |
| 5,803,616 A | * | 9/1998 | Persson | F16C 33/6629 384/466 |
| 5,803,619 A | * | 9/1998 | Tabata | B23Q 1/265 384/518 |
| 6,042,273 A | * | 3/2000 | Thrasher | F16C 25/08 384/517 |
| 6,149,244 A | * | 11/2000 | Wagner | B60B 27/001 29/898.07 |
| 6,199,611 B1 | * | 3/2001 | Wernick | B60C 23/003 152/417 |
| 6,227,713 B1 | * | 5/2001 | Neder | B21B 31/07 384/475 |
| 6,428,212 B1 | * | 8/2002 | Tanaka | B21B 31/076 384/475 |
| 8,376,623 B2 | * | 2/2013 | Shibagaki | F16C 19/56 384/462 |
| 8,764,305 B2 | | 7/2014 | Henneberger | |
| 2004/0213494 A1 | * | 10/2004 | Shimomura | F16C 19/26 384/473 |

FOREIGN PATENT DOCUMENTS

| | | |
|---|---|---|
| DE | 102008025568 | 12/2009 |
| DE | 102010033823 | 2/2011 |
| DE | 102010047983 | 4/2012 |

* cited by examiner

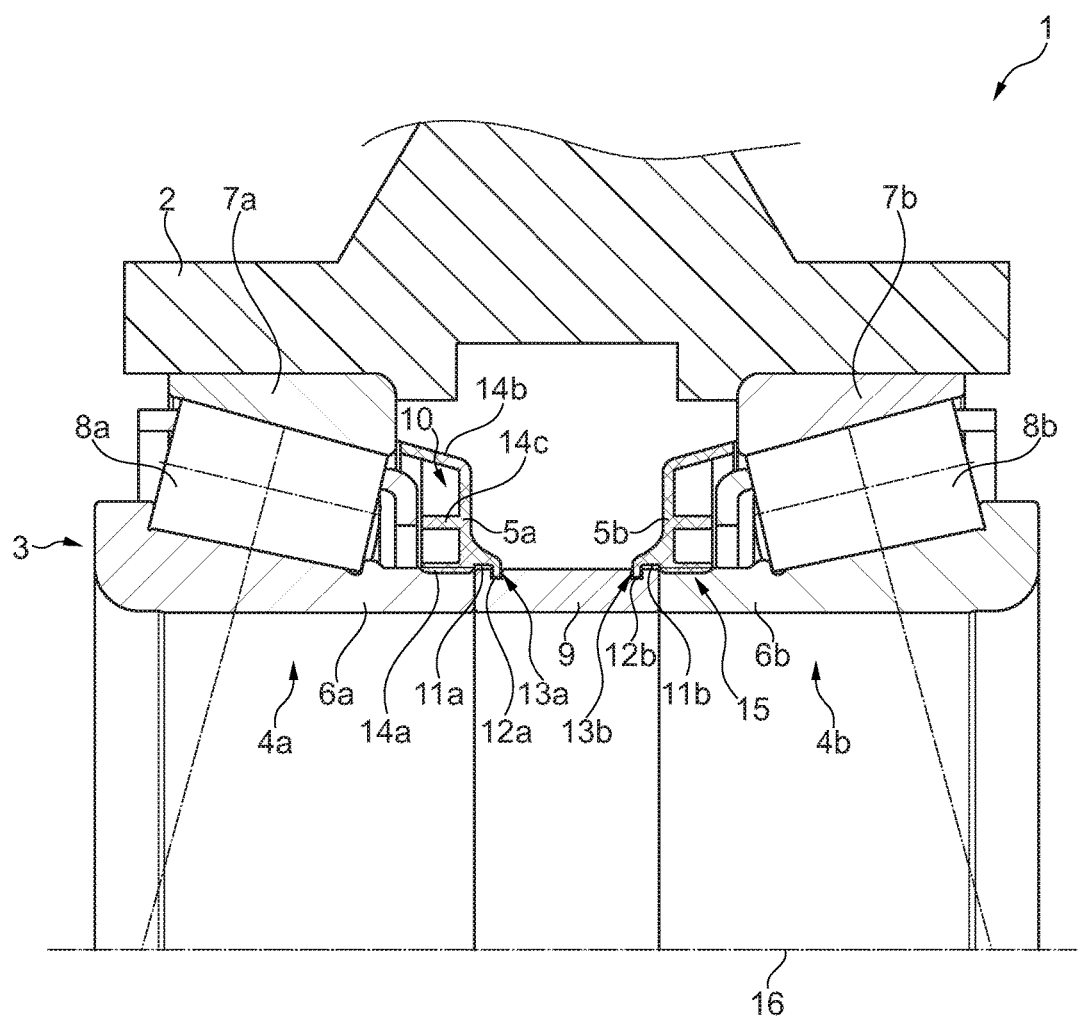

WHEEL BEARING ARRANGEMENT FOR A VEHICLE

INCORPORATION BY REFERENCE

The following documents are incorporated herein by reference as if fully set forth: German Patent Application No. 102015210242.4, filed Jun. 3, 2015.

BACKGROUND

The invention relates to a wheel bearing arrangement for a vehicle, comprising a rotatable component and a statically fixed component and at least two rolling body bearings which are arranged radially between the rotatable and the statically fixed components for rotatably mounting the rotatable component. The at least two rolling body bearings having in each case an inner ring, an outer ring, and a rolling body row arranged in between. A spacer sleeve is also arranged on the end side of the respective inner rings for axially securing the two inner rings.

Wheel bearing arrangements serve substantially to rotatably mount driven or non-driven wheels of a vehicle. Due to high quality requirements, wheel bearing arrangements have to operate without failure in the vehicle over several hundred thousand kilometers.

DE 10 2008 025 568 A1 discloses a wheel bearing arrangement having a rotating part and a stationary part and at least two rolling body rows. The two rotational partners are mounted via the two rolling body rows such that they can be rotated about a rotational axis with respect to one another. Furthermore, the wheel bearing arrangement also comprises a grease distributor ring which is connected fixedly to the rotating rotational partner so as to rotate with it and has a first grease guiding face which is oriented in such a way that lubricating grease is guided to one of the rolling body rows during the rotation of the rotating rotational partner. Here, the lubricating grease comes from a respective lubricating grease reservoir which is arranged on a respective inner ring in the region of an interior space.

Furthermore, DE 10 2010 047 983 A1 has disclosed a tapered roller bearing, comprising an outer ring, an inner ring and a cage for guiding tapered rollers. A spacer element is provided for securing a relative axial position of the inner ring in relation to another bearing ring. Here, the cage or the inner ring is provided for holding the spacer element during the installation of the tapered roller bearing.

SUMMARY

The object of the invention is to provide a wheel bearing arrangement.

According to the invention, a respective securing ring is arranged fixedly on the respective inner ring so as to rotate with it, the respective securing ring having a substantially axially configured lug with a radial embossment, the radial embossment being arranged in a respective groove which is configured on an outer circumferential face of the spacer sleeve, in order to connect the respective inner ring axially to the spacer sleeve via the respective securing ring. Consequently, each rolling body bearing has a dedicated securing ring which comes into contact at least partially therewith on the end side. A lip is particularly preferably configured on the respective securing ring between the respective securing ring and the end face of the respective outer ring, in order to firstly reduce the frictional moment between the respective outer ring and respective securing ring and in order to secondly seal it. The two rolling body bearings are secured axially and therefore held in position via the positively locking connection between the respective securing ring and the spacer sleeve which is arranged axially between the two securing rings.

The respective securing ring preferably has at least two limbs, a first limb being arranged fixedly on a respective outer circumferential face of the respective inner ring so as to rotate with it, and a second limb coming into contact with the end side of a respective outer ring. Here, the first limb is of substantially axial configuration and is arranged radially on the inner ring of the respective rolling body bearing. As a result, a particularly large contact area is provided which realizes a fixed connection between the respective securing ring and the respective inner ring such that they rotate together. In contrast, the bearing area of the respective second limb on the outer ring is minimal. The respective second limb is of substantially axial configuration, but can also have a slight slope and can therefore contain an axial directional component.

The respective securing ring particularly preferably has a third limb, a respective lubricant reservoir for receiving a lubricant being configured at least between the second and the third limb. Consequently, the lubricant reservoir on the respective securing ring accommodates the entire lubricant which is output to the respective rolling body bearing over the service life of the rolling body bearings. Furthermore, the lubricant is preferably lubricating grease which is filled into the lubricant reservoir on the respective securing ring during assembly.

At least one structure for fixedly arranging the respective securing ring on the respective inner ring so as to rotate with it is advantageously configured radially between the respective first limb and the respective inner ring. This structure is preferably configured both on the first limb and on the respective inner ring. In particular, the two structures are of complementary configuration with respect to one another, with the result that the respective securing ring is arranged on the respective inner ring in a positively locking manner and is both fixed axially and is connected fixedly so as to rotate with it as a result.

The invention includes the technical teaching that the respective securing ring is manufactured from a polymer material. In particular, the securing ring is formed of a polyamide material which is preferably reinforced with glass fibers.

It is further preferred that the respective substantially axially configured lug with the respective radial embossment is configured so as to run around on the end side of the respective securing ring. In other words, the respective axially configured lug with the respective radial embossment runs over the entire circumference along the end face of the respective securing ring. However, a plurality of axially configured lugs which are distributed over the circumference with a respective radial embossment are also conceivable, said individual lugs acting as snap-action lugs and engaging into the groove provided for this purpose on the spacer sleeve.

The groove which is configured on the respective spacer sleeve is preferably of complementary configuration with respect to the respective radial embossment. The geometry of the respective groove therefore corresponds substantially to the geometry of the respective radial embossment.

BRIEF DESCRIPTION OF THE DRAWINGS

Further measures which improve the invention will be shown in greater detail in the following text together with the description of one preferred exemplary embodiment of the invention using the single FIGURE.

The single FIGURE shows a part of a diagrammatic longitudinal sectional illustration for illustrating the construction of a wheel bearing arrangement according to the invention.

DETAILED DESCRIPTION OF THE PREFERRED EMBODIMENT

FIG. 1 shows a wheel bearing arrangement 1 according to the invention of a vehicle (not shown here). The wheel bearing arrangement 1 allows the rotation of a wheel (not shown here) of the vehicle about a rotational axis 16. Furthermore, the wheel bearing arrangement 1 comprises a rotatable component and a statically fixed component 2, 3, namely the hub 2 and the inner ring arrangement 3, the inner ring arrangement 3 being fastened on an axle journal (not shown here). Furthermore, two rolling body bearings 4a, 4b for rotatably mounting the rotatable component 2 are arranged radially between the rotatable and the statically fixed components 2, 3. The respective rolling body bearings 4a, 4b each comprise: an inner ring 6a, 6b, an outer ring 7a, 7b, and a rolling body row 8a, 8b arranged radially therebetween.

A respective securing ring 5a, 5b which is filled with a lubricant (not shown here) is arranged fixedly on the respective inner ring 6a, 6b of each bearing 4a, 4b so as to rotate with it and comes into rubbing contact with the respective outer ring 7a, 7b on the end side. During a rotation of the rotatable component 2, the lubricant is guided out of the respective securing ring 5a, 5b to a respective raceway of the respective rolling body bearing 4a, 4b. The two securing rings 5a, 5b are manufactured from a polymer material. Furthermore, a spacer sleeve 9 for axially securing the two inner rings 6a, 6b is arranged on the end side of the respective inner rings 6a, 6b.

It is noted that the wheel bearing arrangement 1 is of symmetrical construction, with the result that the description of one securing ring 5a likewise also applies to the other securing ring 5b. The respective securing ring 5a, 5b has an axially configured lug 11a, 11b with a respective radial embossment 12a, 12b, the radial embossment 12a, 12b being arranged in a respective groove 13a, 13b which is configured on an outer circumferential face of the spacer sleeve 9, in order to connect the respective inner ring 6a, 6b axially to the spacer sleeve 9 via the respective securing ring 5a, 5b. The respective axially configured lug 11a, 11b with the respective radial embossment 12a, 12b is configured so as to run around on the end side of the respective securing ring 5a, 5b. The respective grooves 13a, 13b which are configured on the spacer sleeve 9 are of complementary configuration with respect to the respective radial embossments 12a, 12b.

Furthermore, the respective securing ring 5a, 5b has three limbs 14a, 14b. A first limb 14a is arranged fixedly on a respective outer circumferential face of the respective one of the inner rings 6a, 6b so as to rotate with it. Furthermore, a second limb 14b comes into contact with the end side of a respective one of the outer rings 7a, 7b. Furthermore, the third limb 14c is configured radially between the first and the second limb 14a, 14b and extends axially, a respective lubricant reservoir 10 for receiving the lubricant being configured between the second and the third limb 14b, 14c. A structure 15 for fixedly arranging the respective securing ring 5a, 5b on the respective inner ring 6a, 6b so as to rotate with it is configured radially between the respective first limb 14a and the respective inner ring 6a, 6b. This structure is formed of elevations and depressions and, by way of the positively locking connection, improves the connection between the respective securing ring 5a, 5b and the respective inner ring 6a, 6b.

LIST OF ELEMENT DESIGNATIONS

1 Wheel bearing arrangement
2 Rotatable component
3 Statically fixed component
4a, 4b Rolling body bearing
5a, 5b Securing ring
6a, 6b Inner ring
7a, 7b Outer ring
8a, 8b Rolling body row
9 Spacer sleeve
10 Lubricant reservoir
11a, 11b Lug
12a, 12b Radial embossment
13a, 13b Groove
14a-14c Limb
15 Structure
16 Rotational axis

The invention claimed is:

1. A wheel bearing arrangement for a vehicle, comprising a rotatable component and a statically fixed component, and at least two rolling body bearings arranged radially between the rotatable component and the statically fixed component for rotatably mounting the rotatable component;
the at least two rolling body bearings each including: an inner ring, an outer ring, and a rolling body row arranged therebetween;
a spacer sleeve arranged between end sides of the respective inner rings for axially securing the two inner rings, the spacer sleeve including grooves located on an outer circumferential face thereof;
securing rings, one of which is arranged fixedly on each of the respective inner rings so as to rotate therewith, the securing rings each including a substantially axially configured lug with a respective radial embossment, the radial embossment being arranged in a respective one of the grooves located on the outer circumferential face of the spacer sleeve, in order to connect each of the respective inner rings axially to the spacer sleeve via the respective securing ring.

2. The wheel bearing arrangement as claimed in claim 1, wherein the securing rings each include respective first and second limbs, each of the first limbs being arranged fixedly on a respective outer circumferential face of the respective inner ring so as to rotate therewith, and each of the second limb coming into contact with an end side of a respective one of the outer rings.

3. The wheel bearing arrangement as claimed in claim 1, wherein the securing rings each include respective first and second limbs, and wherein at least one structure for fixedly arranging the respective securing ring on the respective inner ring so as to rotate therewith is configured radially between the respective first limb and the respective inner ring.

4. The wheel bearing arrangement as claimed in claim 3, wherein the structure forms a positively locking connection between the respective first limb and the respective inner ring.

5. The wheel bearing arrangement as claimed in claim 4, wherein the positively locking connection is formed of elevations and depressions.

6. The wheel bearing arrangement as claimed in claim 1, wherein the securing rings are manufactured from a polymer material.

7. The wheel bearing arrangement as claimed in claim 1, wherein the respective substantially axially configured lug with the respective radial embossment is configured to run around on an end side of the respective securing ring.

8. The wheel bearing arrangement as claimed in claim 1, wherein the grooves on the spacer sleeve each have a complementary configuration to the respective radial embossments.

9. The wheel bearing arrangement as claimed in claim 1, wherein the securing rings each include respective first and second limbs, and wherein each of the first limbs contacts a respective one of the inner rings and each of the second limbs contacts a respective one of the outer rings.

10. The wheel bearing arrangement as claimed in claim 9, wherein the securing rings each include respective third limbs arranged between the respective first and second limbs.

11. A wheel bearing arrangement for a vehicle, comprising a rotatable component and a statically fixed component, and at least two rolling body bearings arranged radially between the rotatable component and the statically fixed component for rotatably mounting the rotatable component;
   the at least two rolling body bearings each including: an inner ring, an outer ring, and a rolling body row arranged therebetween;
   a spacer sleeve arranged between end sides of the respective inner rings for axially securing the two inner rings, the spacer sleeve including grooves located on an outer circumferential face thereof;
   securing rings, one of which is arranged fixedly on each of the respective inner rings so as to rotate therewith, the securing rings each including a substantially axially configured lug with a respective radial embossment, the radial embossment being arranged in a respective one of the grooves located on the outer circumferential face of the spacer sleeve, in order to connect each of the respective inner rings axially to the spacer sleeve via the respective securing ring,
   wherein the securing rings each include a respective first, second, and third limb, a respective lubricant reservoir for receiving a lubricant being configured at least between the second and the third limb on each of the securing rings.

* * * * *